(12) United States Patent
Mahoney et al.

(10) Patent No.: US 7,359,609 B2
(45) Date of Patent: Apr. 15, 2008

(54) STORAGE TROUGH AND FIBER MANAGEMENT SYSTEM

(75) Inventors: William G. Mahoney, Suwanee, GA (US); Steven E. Blashewski, Duluth, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 11/275,588

(22) Filed: Jan. 18, 2006

(65) Prior Publication Data

US 2006/0280419 A1 Dec. 14, 2006

Related U.S. Application Data

(60) Provisional application No. 60/595,190, filed on Jun. 14, 2005.

(51) Int. Cl.
*G02B 6/00* (2006.01)
(52) U.S. Cl. ........................... 385/135; 385/134
(58) Field of Classification Search ................. 385/135
See application file for complete search history.

(56) References Cited

U.S. PATENT DOCUMENTS

| | | | |
|---|---|---|---|
| 4,722,585 A * | 2/1988 | Boyer | 385/135 |
| 5,167,001 A | 11/1992 | Debortoli et al. | |
| 5,402,515 A * | 3/1995 | Vidacovich et al. | 385/135 |
| 5,802,237 A * | 9/1998 | Pulido | 385/135 |
| 5,929,381 A | 7/1999 | Daoud | |
| 5,966,492 A | 10/1999 | Bechamps et al. | |
| 5,987,207 A * | 11/1999 | Hoke | 385/135 |
| 6,215,938 B1 * | 4/2001 | Reitmeier et al. | 385/135 |
| 6,263,141 B1 * | 7/2001 | Smith | 385/135 |
| 6,263,143 B1 * | 7/2001 | Potteiger et al. | 385/135 |
| 6,272,276 B1 * | 8/2001 | Potteiger et al. | 385/135 |
| 6,389,211 B1 * | 5/2002 | Mandry et al. | 385/135 |
| 6,487,356 B1 * | 11/2002 | Harrison et al. | 385/135 |
| 6,584,267 B1 * | 6/2003 | Caveney et al. | 385/134 |
| 6,788,846 B2 * | 9/2004 | Hileman et al. | 385/27 |
| 2004/0062508 A1 | 4/2004 | Blankenship et al. | |
| 2005/0249474 A1* | 11/2005 | Tan | 385/135 |

FOREIGN PATENT DOCUMENTS

GB  2 351 359 A  12/2000

* cited by examiner

*Primary Examiner*—Frank G. Font
*Assistant Examiner*—Ryan Lepisto

(57) ABSTRACT

A fiber management system for managing fiber optic cables within an enclosure. The fiber management system includes a trough having a plurality of slots for receiving and detachably retaining connectors of the fiber optic cables. A spool is coupled to the trough for coiling the excess length of the fiber optic cables. The trough is fixedly mounted to the inside of the enclosure to allow access to the interior of the enclosure without movement of trough without the fiber optic cables becoming entangled.

19 Claims, 4 Drawing Sheets

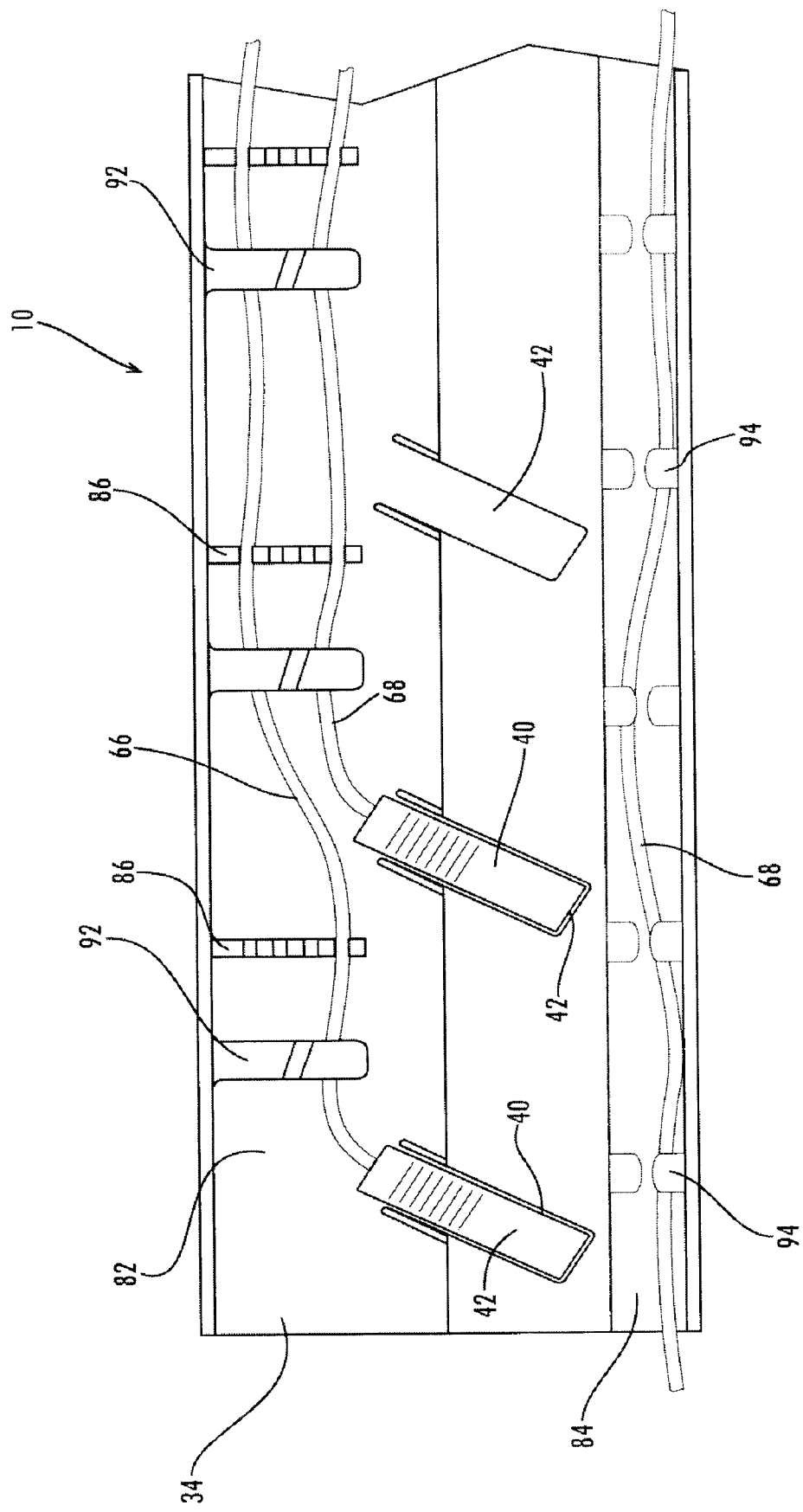

STORAGE TROUGH AND FIBER MANAGEMENT SYSTEM

CROSS-REFERENCE TO RELATED APPLICATIONS

This application claims priority to U.S. provisional application Ser. No. 60/595,190 filed Jun. 14, 2005, which is incorporated herein by reference.

TECHNICAL FIELD

The present invention relates to a storage trough and fiber management system for arranging fiber optic cables within an enclosure such as a CATV node.

BACKGROUND OF THE INVENTION

In enclosures such as CATV nodes, for example Scientific-Atlanta's Gainmaker® or 1 GHz node, cable management is typically difficult as enclosures get smaller and capability expands. In outdoor enclosures this is particularly difficult due to the minimal amount of free space and the fact that the upper and lower housing halves are closed up together and compress the cables inside. Sometimes the housing does not seal properly. Additionally, when housings are opened and closed, the cables within the housing move around and flex.

It is known in CATV nodes to have a foldout or pivoting tray in one half of the housing or enclosure. This tray is often moved to gain access to components underneath. When the tray is moved, the fiber optic cables collected in the tray are disrupted. This is because the fiber optic cable is wrapped around clamps in the corners of the tray and, when moving the tray, these cables become entangled with one another. Once the cables become entangled, they become difficult to use resulting in a significant loss of time. However, it is desirable to minimize the amount of fiber optical cable that is moved when servicing a node. What is needed is a way to coil fiber optic cable and retain the fiber optic connectors within the enclosure without moving them within the enclosure while servicing the node until each of the fiber optic cables are needed.

BRIEF DISCRIPTION OF THE DRAWINGS

FIG. 4 illustrates a partial top view of the trough of FIG. 1.

DETAILED DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

Figure 1:
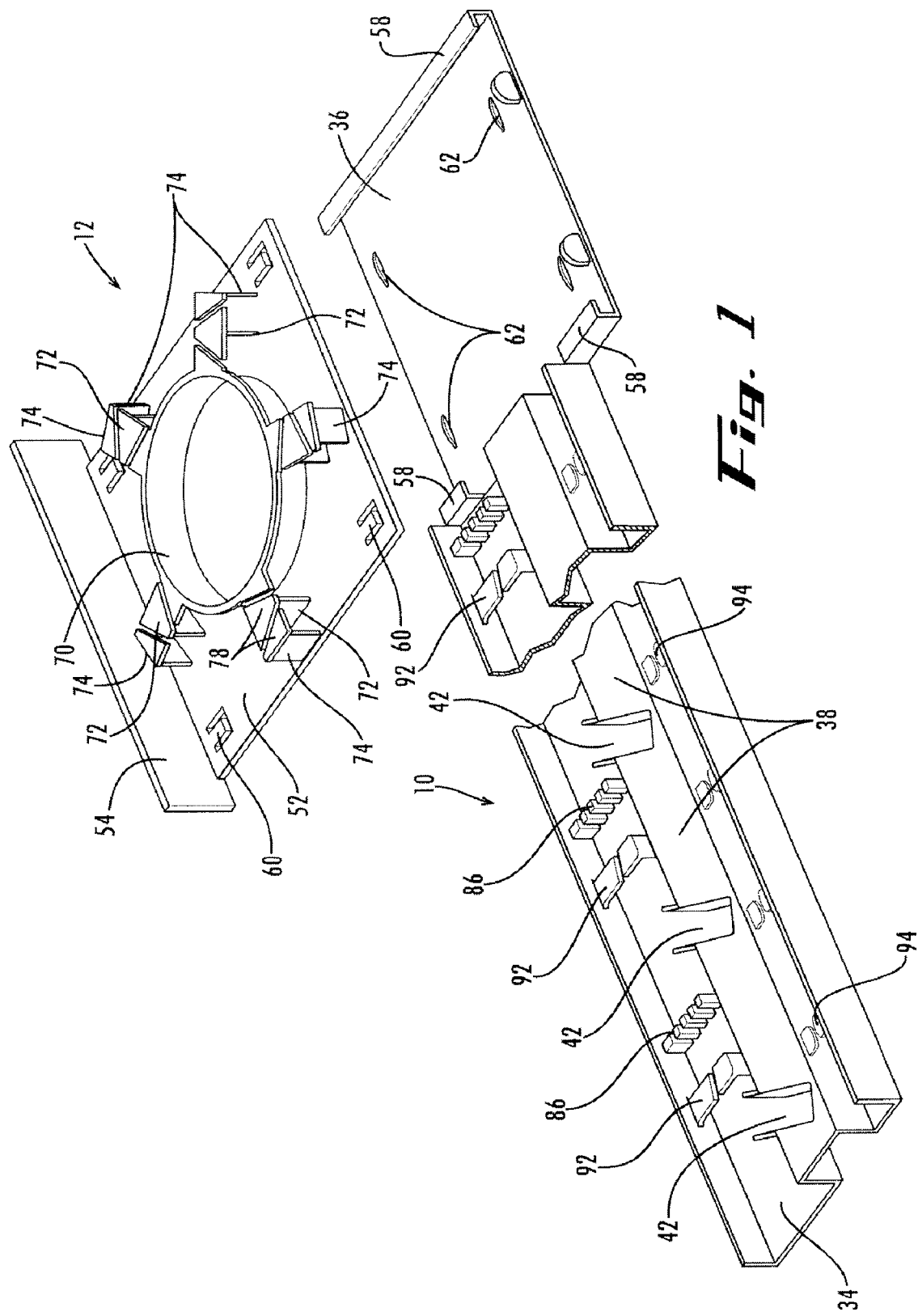
FIG. 1 illustrates a perspective view of a trough and slide out spool for managing fiber optic cables within a fiber optic node according to one embodiment of the present invention.
Figure 2:
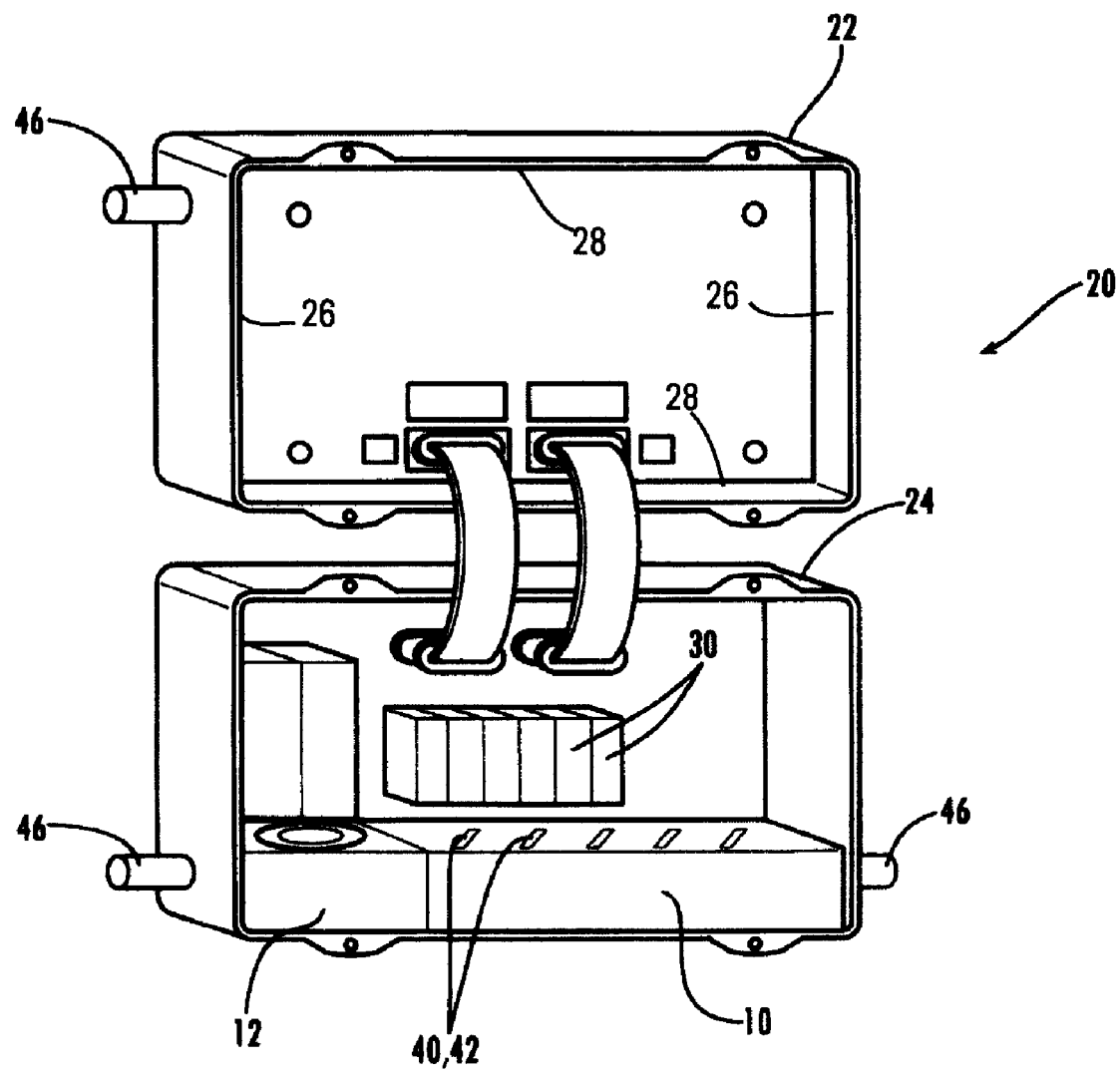
FIG. 2 illustrates a perspective view of the fiber optic node in an open position with the trough and spool mounted to an inside sidewall of the enclosure.

FIG. 1 illustrates one embodiment of a trough 10 and detachable spool 12 for managing fiber optic cable and connectors within a CATV node according to one embodiment of the present invention. FIG. 2 illustrates a node 20 in the open position with an upper portion 22 and a lower portion 24. In one embodiment, the lower portion 24 includes a fiber optic interface board for receiving and retaining modular fiber optic devices 30 such as an optical receiver or transmitter. The upper portion 22 may include an interface board such as an amplifier board. The portion of the enclosure defined by lower portion 22 includes a back, two opposing side walls 26, and two opposing end walls 28, with an accessible opening opposite the back.

In one embodiment, the trough 10 is made of thermoplastic or polycarbonate, for example, but other suitable materials may be used. The trough 10 is to be fixedly mounted to one of the opposing side walls 26 and extends widthwise between the accessible opening and the back. The trough 10 should be mounted in such a way that it does not need to be moved or pivoted in order to gain access to components within the node 20 such as the optical receivers and transmitters.

As best shown in FIG. 1, the trough 10 includes an elongated portion 34 and a spool receiving portion 36. The combined length of the elongated portion 34 and the receiving portion 36 is preferably long enough to correspond with the inside of one of the side walls 26. The elongated portion 34 preferable has upturned edges along its length and an elongated mound portion 38 extending from end to end. Along the length of the mound portion 38 are slots 42 for receiving and retaining fiber optic connectors 40. Preferably there are eight slots 42 for receiving eight fiber optic connectors 40 because of the number of fiber optic cables typically provided by a fiber optic stub at any of the connectors 46 into the node. However, any number of fiber optic cables can be provided along with any number of slots 42 for receiving and retaining the fiber optic connectors 40. Preferably, the fiber optic connectors 40 are snap fit or friction fit into the slots 42. For example, inside each slot 42 may be one or more ridges or tabs which may urge against a fiber optic connector 40 when within a slot 42.

Figure 3:
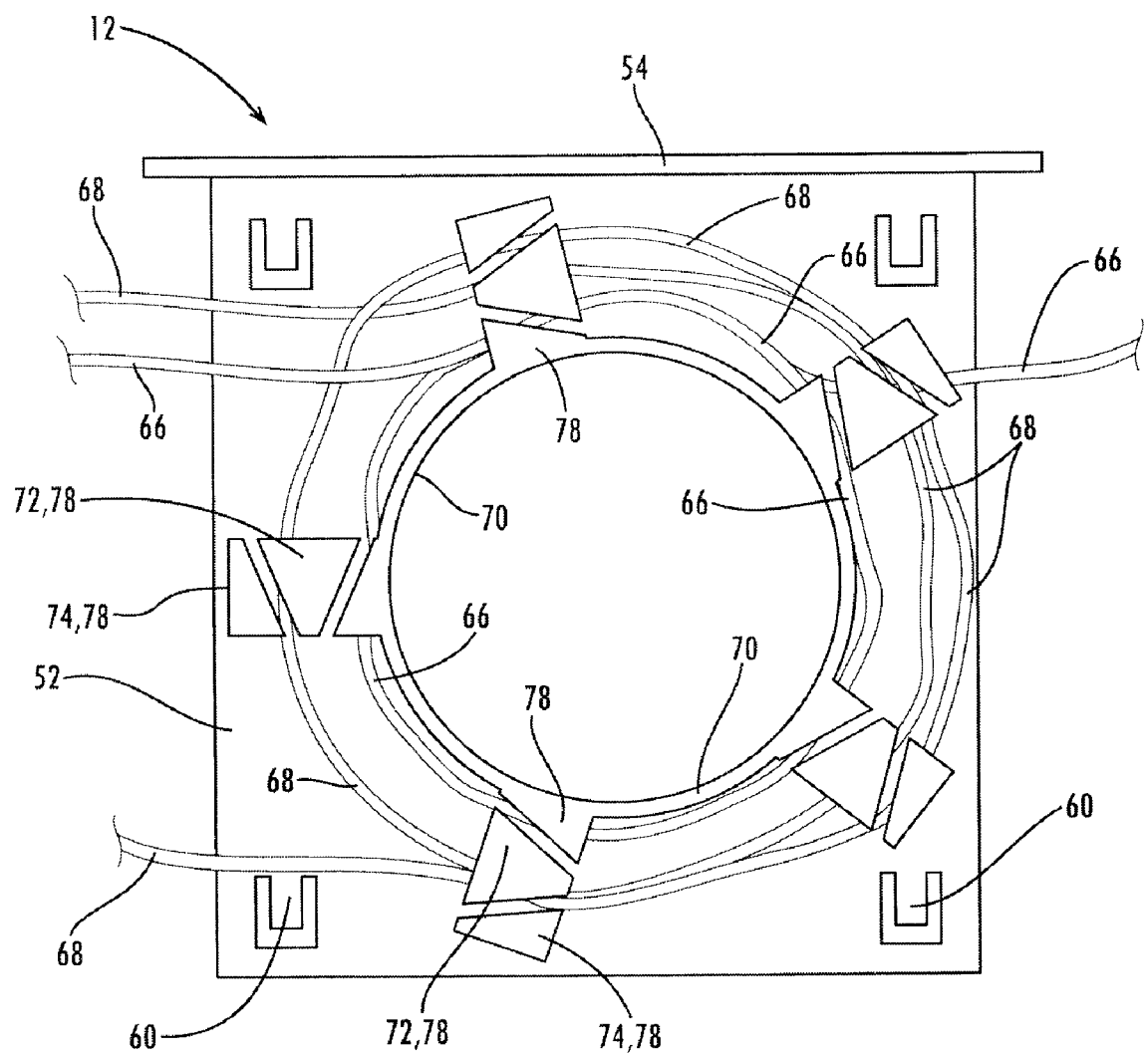
FIG. 3 illustrates a top view of the slide out spool of FIG. 1.

In one embodiment, as best shown in FIGS. 1 and 3, the detachable spool 12 includes a back portion 52 and a top portion 54 which are preferably connected to one another along an edge of the back and top portions 52, 54. The thickness of the back portion 52 should correspond with tracks 58 defined along edges of the spool receiving portion 36. When the spool 12 is slid into the tracks 58 of the spool receiving portion 36, tabs 60 engage openings 62 for detachably retaining the spool 12 in place. Other means may be used to mount the spool 12 to the elongated portion 34. For example, the spool 12 may be directly mounted to or integral to the elongated portion 34. Also, the spool 12 may be attached at one corner and allowed to pivot away from the receiving portion 36 and the elongated portion 34.

The spool 12 is preferably made of the same material as the trough 10 and is configured to receive the excess length of a plurality of fiber optic cables within a node enclosure. Fiber optic cable can be received at either side of a node from a fiber optic stub and, therefore, fiber optic cable may be coiled within the spool 12 from either side. For example, as shown if FIG. 3, fiber optic cable 66 is received from the right and fiber optic cable 68 is received from the left. Fiber optic cables 66, 68 are each spooled in the spool 12. However, fiber optic cable 66 is coiled between an innermost protrusion 70 which in one embodiment is circular and extends upward from back portion 52 and a second plurality of protrusions 72 which also extend upward from back portion 52. The protrusion 70 and protrusions 72 define an inner diameter for receiving one or more coiled fiber optic cables such as fiber optic cable 66. In another embodiment, the protrusion 70 may instead be a plurality of upward protrusions.

A second diameter for coiling fiber optic cable, such as fiber optic cable 68, is defined between protrusion 72 and a plurality of outer-most protrusions 74. Providing different diameters for coiling allows critical bend radiuses of the fiber optic cable to be maintained. The upper-most points of the protrusion 70, protrusions 72 and the protrusion 74 may include horizontally-oriented edges or flanged portions 78 for retaining fiber optic cable between adjacent protrusions. The spacing between adjacent pairs of flanged portions 78 should be suitable to permit a single fiber optic cable to pass in between, but then retain the fiber optic cables underneath until it is desirable to uncoil the fiber optic cable from the spool 12. Some of the fiber optic cables may be of different length or may have excess length and so they may require more coiling than others. In FIG. 3, fiber optic cables 66, 68 exits the spool to the upper left and proceeds to trough 10.

Figure 5:
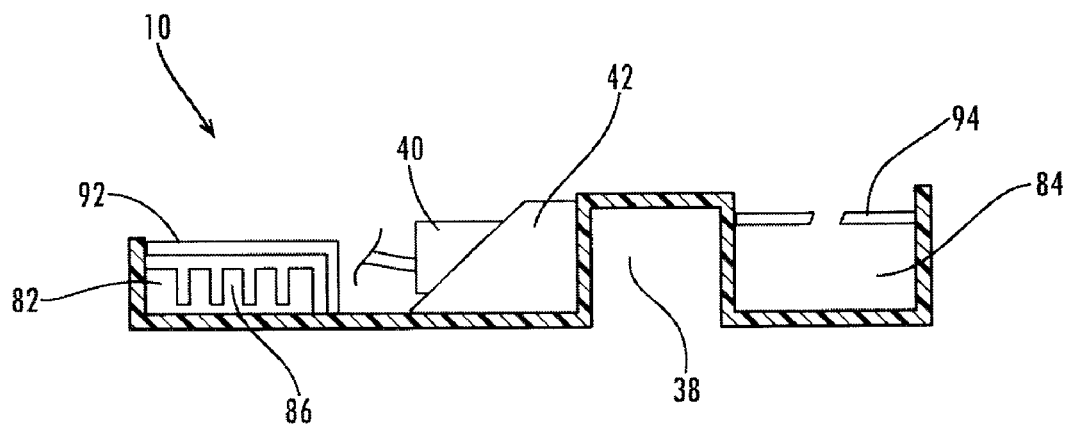
FIG. 5 illustrates an end view of the trough of FIG. 1.

Trough 10 includes two channels on either side of the mound portion 38 and between the upturned edges of the elongated portion 34 as best shown in FIGS. 1, 4 and 5. The fiber optic cables 66, 68 from the spool 12 extend down channel 82 to permit fiber optic cable connectors 40 to be received in slots 42. Excess fiber optic cable may be coiled in the spool 12 to permit only enough length to extend down channel 82 so that one connector 40 reaches one of the slots 42. Channel 84 on the opposite side of the mound portion 38 is for receiving fiber optic cable from the fiber optic stub to the node and to then provide the fiber optic cables to the spool 12 if the fiber optic cable stub accesses the node's enclosure on the end wall 28 furthest from the spool 12. In FIG. 4, fiber optic cable 68 is depicted as being provided to the spool 12.

The channel 82 may include one or more combs for retaining fiber optical cables within the channel 82. For example, in FIG. 4, fiber optic cables 66, 68 are each separately received between adjacent teeth of combs 86. The combs 86 allow the spacing to be maintained between the fiber optic cables within the channel 82. Preferably there are enough teeth on each comb 86 to accommodate the number of fiber optic cables provided from the fiber optic stub to the node.

Also, clips may be used to retain fiber optic cable within channels 82, 84. In FIG. 4, clips 92 have two portions which define a space in between for permitting fiber optic cable to pass through, but the two portions of each of the clips 92 are close enough to retain one or more fiber optic cables within the channel 82. Also, in FIG. 4, clips 94 have two portions which define a space in between for permitting fiber optic cable to pass through, but the two portions of each of the clips 94 are close enough to retain one or more fiber optic cables within the channel 84.

The process of coiling fiber optic cable in the spool 12 and in elongated portion 34 may be referred to as dressing out the fiber optic cable. Once the fiber optic cable is dressed out, a connector 40 in a slot 42 may be removed from the slot 42 without any fiber optic cables becoming entangled and then is connected to an optical device within the enclosure of the node such as an optical receiver and transmitter.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A fiber management system for managing fiber optic cables within an enclosure having opposing sidewalls, opposing end walls, a back, and an opening opposite the back, comprising:
    a trough having a plurality of slots defined therein for receiving and detachably retaining connectors of fiber optic cables, wherein said trough is adapted to be fixedly mounted to a sidewall within the enclosure to allow access to components located at the back interior of the enclosure without movement of said trough; and
    a spool for coiling excess length of fiber optic cables said spool detachably attached to said trough.

2. The fiber management system of claim 1 wherein said trough comprises an elongated portion and a spooi receiving portion, said spool receiving portion for receiving and detachably retaining said spool.

3. The fiber management system of claim 2 wherein said spool receiving portion and said elongated portion have a combined length that corresponds with a side wall of the enclosure.

4. The fiber management system of claim 1 wherein said spool is slidably detachable from said trough.

5. The fiber management system of claim 1 wherein said spool is pivotally mounted to said trough.

6. The fiber management system of claim 1 wherein said spool defines an inner diameter for receiving one or more coiled fiber optic cables.

7. The fiber management system of claim 6 wherein said spool further defines a second diameter for receiving one or more other fiber optic cables, the one or more fiber optic cables within said inner diameter and the one or more other fiber optic cables within said second diameter are coiled separately from one another.

8. The fiber management system of claim 6 wherein the one or more fiber optic cables are coiled around an innermost protrusion.

9. The fiber management system of claim 8 wherein said inner-most protrusion comprises a plurality of first protrusions.

10. The fiber management system of claim 6 wherein said inner diameter is defined between a plurality of first protrusions and a plurality of second protrusions.

11. The fiber management system of claim 10 wherein said spool further defines a second diameter for receiving one or more other fiber optic cables, the one or more fiber optic cables within said inner diameter and the one or more other fiber optic cables within said second diameter are coiled separately from one another, and wherein said second diameter is defined between said plurality of second protrusions and a plurality of third protrusions.

12. The fiber management system of claim 1 wherein a portion of the lengths of the fiber optic cables extend along the length of said trough and another portion of the length of the fiber optic cables is coiled in said spool.

13. The fiber management system of claim 12 wherein said portion of said fiber optic cable extends along a channel defined in said trough.

14. The fiber management system of claim 12 wherein said fiber optic cable accesses said enclosure at an end wall of said enclosure opposite said spool and said portion of the length of said fiber optic cable first extends along said trough and then said other portion of the length of said fiber optic cable is coiled in said spool.

15. A method for managing fiber optic cable within an enclosure, said method comprising the following steps:
   fixedly attaching a trough to a sidewall within an interior of said enclosure to preclude said trough from being moved when accessing optical devices provided at a back interior of said enclosure;
   receiving a fiber optic cable into the interior of the enclosure through an end wall of said enclosure;
   retaining a portion of the length of said fiber optic cable within the interior of the enclosure along the length of said trough; and
   coiling another portion of the length of said fiber optic cable in a spool coupled to said trough.

16. The method of claim 15 further comprising the step of retaining a comiector of said fiber optic cable in said trough.

17. The method of claim 15 further comprising the step of accessing optical devices at the back interior of said enclosure to connect connectors of fiber optic cables to the optical devices within said enclosure without moving said trough within said enclosure.

18. The method of claim 15, wherein said steps of receiving, retaining, and coiling said fiber optic cable, comprises:
   extending a first portion of a first fiber optic cable accessing said enclosure at an end wall of said enclosure opposite said spool along said trough;
   coiling a second portion of said first fiber optic cable to said spool; and
   coiling to said spool a portion of the length of a second fiber optic cable that accesses said enclosure at an end wall adjacent said spool.

19. A fiber management system for managing fiber optic cables within an enclosure, comprising:
   a trough having a plurality of slots defined therein for receiving and detachably retaining connectors of fiber optic cables, wherein said trough adapted to be fixedly mounted to the inside of the enclosure to allow access to the interior of the enclosure without movement of said trough from the enclosure;
   a spool for coiling excess length of fiber optic cables;
   a first fiber optic cable accessing an interior of said enclosure at an end wall of said enclosure opposite said spool and said first portion of said first fiber optic cable first extends along said trough and then a second portion of the length of said first fiber optic cable is coiled in said spool; and
   a second fiber optic cable accesses the interior of said enclosure at an end wall adjacent said spool and a portion of the length said second fiber optic cable is first coiled in said spool.

* * * * *